United States Patent
Meng (10) Patent No.: US 9,950,270 B2
(45) Date of Patent: Apr. 24, 2018

(54) ELECTRONIC DEVICE AND METHOD FOR CONTROLLING TOY USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Qing-Chen Meng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 105 days.

(21) Appl. No.: 15/047,227

(22) Filed: Feb. 18, 2016

(65) Prior Publication Data

US 2017/0165587 A1 Jun. 15, 2017

(30) Foreign Application Priority Data

Dec. 11, 2015 (CN) .......................... 2015 1 0918208

(51) Int. Cl.
*A63H 3/04* (2006.01)
*A63H 30/04* (2006.01)
*G06F 3/0481* (2013.01)
*G06F 3/0487* (2013.01)
*G06F 3/0488* (2013.01)

(52) U.S. Cl.
CPC .......... *A63H 30/04* (2013.01); *G06F 3/0487* (2013.01); *G06F 3/0488* (2013.01); *G06F 3/04815* (2013.01); *G06F 3/04886* (2013.01); *A63H 2200/00* (2013.01)

(58) Field of Classification Search
CPC ........ A63H 30/00; A63H 30/02; A63H 30/04; A63H 2200/00
See application file for complete search history.

(56) References Cited

U.S. PATENT DOCUMENTS

| 6,597,347 B1 * | 7/2003 | Yasutake | G06F 3/0338 |
| | | | 178/18.01 |
| 9,569,954 B2 * | 2/2017 | Ganz | G08C 17/02 |
| 2010/0079410 A1 * | 4/2010 | Minton | G06F 3/016 |
| | | | 345/175 |
| 2010/0093255 A1 * | 4/2010 | Yamamoto | A63F 9/0291 |
| | | | 446/456 |
| 2012/0232718 A1 * | 9/2012 | Rischmuller | A63H 27/12 |
| | | | 701/2 |
| 2013/0109272 A1 * | 5/2013 | Rindlisbacher | A63H 30/04 |
| | | | 446/454 |
| 2014/0008496 A1 * | 1/2014 | Ye | B64C 13/20 |
| | | | 244/190 |

(Continued)

*Primary Examiner* — Gene Kim
*Assistant Examiner* — Alyssa Hylinski
(74) *Attorney, Agent, or Firm* — ScienBiziP, P.C.

(57) ABSTRACT

A method of controlling a toy using an electronic device includes generating a control interface that includes at least one function button. The control interface is displayed on a 3D touch screen of the electronic device. A pressure value on the at least one function button is obtained, when the at least one function button is not divided into different areas. An acceleration speed for the toy is determined according to the detected pressure value. The toy is controlled to execute a function corresponding to the at least one function button based on the determined acceleration speed.

18 Claims, 7 Drawing Sheets

(56) References Cited

U.S. PATENT DOCUMENTS

| | | | |
|---|---|---|---|
| 2015/0026649 A1* | 1/2015 | Zhao | G06F 3/0484 715/863 |
| 2015/0325211 A1* | 11/2015 | Lee | G06F 3/0481 345/1.3 |
| 2016/0091895 A1* | 3/2016 | Hed | A63H 30/04 701/2 |
| 2016/0129358 A1* | 5/2016 | Eversoll | A63H 30/04 463/40 |
| 2016/0188181 A1* | 6/2016 | Smith | G06F 3/048 715/765 |

* cited by examiner

FIG.5C

ELECTRONIC DEVICE AND METHOD FOR CONTROLLING TOY USING THE SAME

CROSS-REFERENCE TO RELATED APPLICATIONS

This application claims priority to Chinese Patent Application No. 201510918208.6 filed on Dec. 11, 2015, the contents of which are incorporated by reference herein.

FIELD

The subject matter herein generally relates to remote controlling technology, and particularly to an electronic device and a method for controlling a toy using the electronic device.

BACKGROUND

A toy such as a toy car or an aircraft can be controlled using an electronic device (e.g., a mobile phone). For example, a user can control the toy to move forward or move backward, by sliding on a display device of the electronic device with a different sliding speed. However, this kind of controlling method requires the user to slide on the display device all the time to control the toy.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
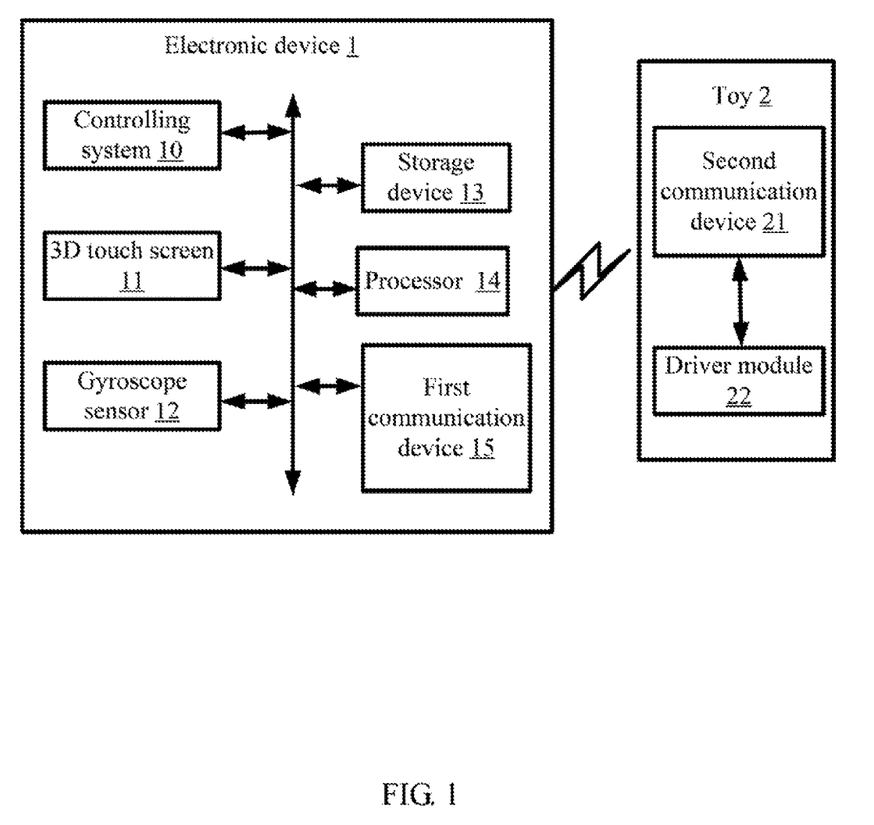
FIG. 1 is a block diagram of one embodiment of an electronic device and a toy.

FIG. 1 is a block diagram of one embodiment of an electronic device and a toy. Depending on the embodiment, an electronic device 1 includes a controlling system 10, a three-dimensional (3D) touch screen 11, a gyroscope sensor 12, a storage device 13, at least one processor 14, and a first communication device 15. The above components can connect to each other via a data bus. The electronic device 1 can be a smart phone, a personal digital assistant (PDA), a tablet computer, or any other suitable electronic device. A toy 2 can include a second communication device 21 and a driver module 22.

FIG. 1 illustrates only one example of the electronic device 1 and the toy 2 that can include more or fewer components than illustrated, or have a different configuration of the various components in other embodiments. For example, the electronic device 1 and the toy 2 may further include a voice module.

In at least one embodiment, the electronic device 1 can communicate with the toy 2 using the first communication device 15 and the second communication device 21. The first communication device 15 and the second communication device 21 can provide a function of network communication and data transmission for the electronic device 1 and the toy 2, based on a wired or wireless network transmission method. The wired or wireless network transmission method may include, but are not limited to, a traditional network connection, general packet radio service (GPRS), wireless fidelity (WIFI).

In at least one embodiment, the controlling system 10 can control a movement speed of the toy 2 via the driver module 22, according to a pressure value detected by the 3D touch screen 11. Details will be provided in the following paragraphs.

The gyroscope sensor 12 can detect a rotation direction of the electronic device 1.

The storage device 13 can be an internal storage device, such as a flash memory, a random access memory (RAM) for temporary storage of information, and/or a read-only memory (ROM) for permanent storage of information. The storage device 13 can also be an external storage device, such as an external hard disk, a storage card, or a data storage medium.

The at least one processor 14 can be a central processing unit (CPU), a microprocessor, or other data processor chip that performs functions of the electronic device 1.

Figure 2:
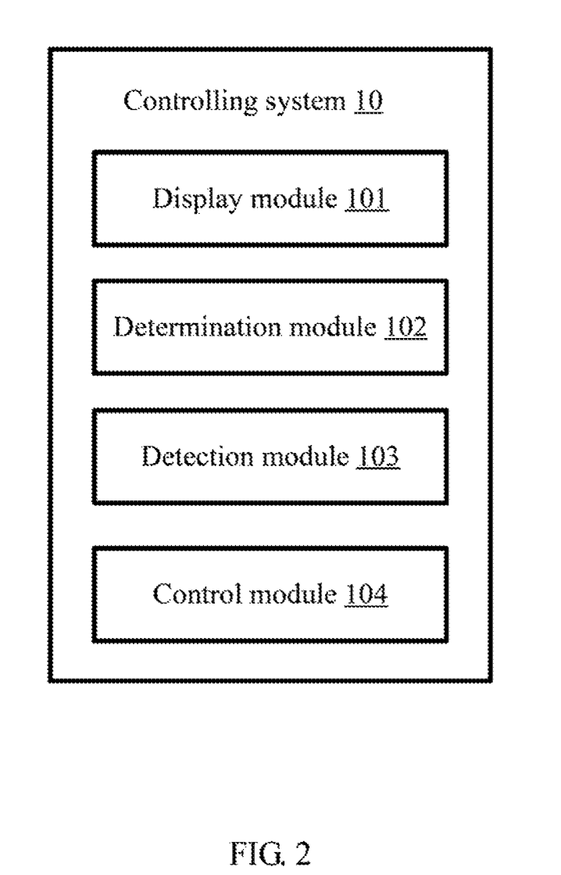
FIG. 2 is a block diagram of one embodiment of modules of a controlling system.

FIG. 2 is a block diagram of one embodiment of modules of the controlling system 10. In at least one embodiment, the controlling system 10 can include a display module 101, a determination module 102, a detection module 103, and a control module 104. The modules 101-104 can include computerized codes in the form of one or more programs, which are stored in the storage device 13, and are executed by the at least one processor 14 of the electronic device 1 to control the toy 2.

Figure 3:
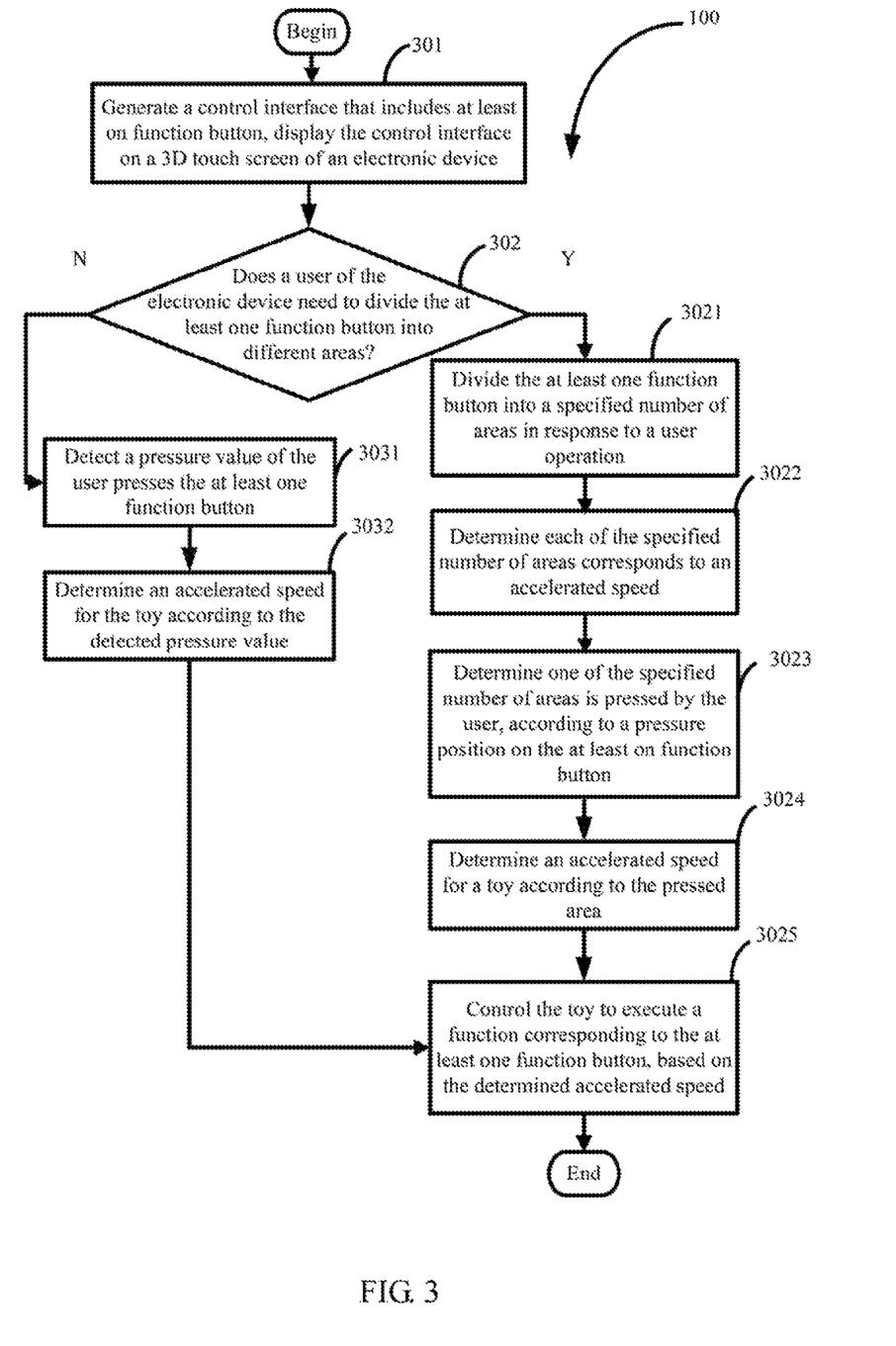
FIG. 3 illustrates a flowchart of one embodiment of a method for controlling the toy using the electronic device of FIG. 1.

FIG. 3 illustrates a flowchart which is presented in accordance with an example embodiment. The example method 100 is provided by way of example, as there are a variety of ways to carry out the method. The method 100 described below can be carried out using the configurations illustrated in FIG. 1, for example, and various elements of these figures are referenced in explaining example method 100. Each block shown in FIG. 3 represents one or more processes, methods, or subroutines, carried out in the exemplary method 100. Additionally, the illustrated order of blocks is by example only and the order of the blocks can be changed according to the present disclosure. The exemplary method 100 can begin at block 301. Depending on the embodiment, additional steps can be added, others removed, and the ordering of the steps can be changed.

At block 301, the display module 101 can generate a control interface and display the control interface on the 3D touch screen 11. In at least one embodiment, the control interface includes at least on function button. The at least one function button may include, but are not limited to, a forward button that is used to control the toy 2 to move forward, a backward button that is used to control the toy 2 to move backward, and a stop button that is used to control the toy 2 to stop.

Figure 4:
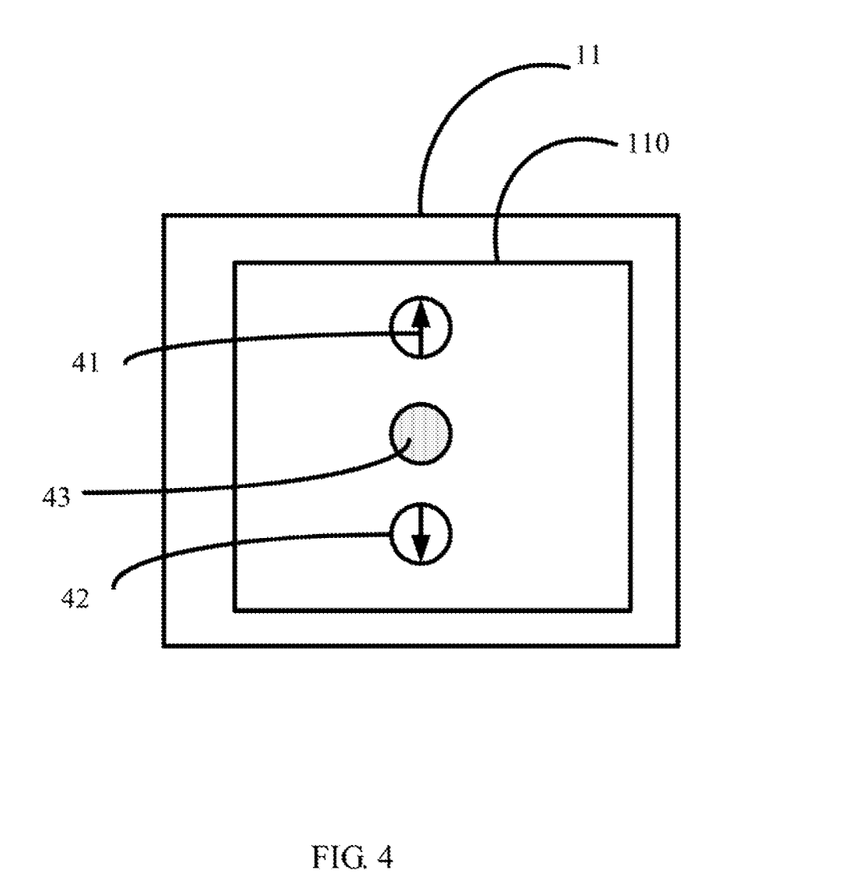
FIG. 4 illustrates an example of a control interface.

For example, as shown in FIG. 4, the display module 101 generates a control interface 110, and display the control interface 110 on the 3D touch screen 11. The control interface 110 includes three function buttons, the three function buttons include a forward button 41, a backward button 42, and a stop button 43.

At block 302, the determination module 102 can determine whether a user of the electronic device 1 needs to divide the at least one function button into different areas. When the user needs to divide the at least on function button into different areas, the process goes to block 3021. When the user does not need to divide the at least on function button into different areas, the process goes to block 3031.

In at least one embodiment, the determination module 102 can display a dialog box on the 3D touch screen 11, and ask the user whether the at least one function button should be divided into different areas using the dialog box. The determination module 102 further determines whether the user needs to divide the at least on function button into different areas or not, according to a selection from the dialog box of the user.

At block 3021, the detection module 103 can divide the at least one function button into a specified number of areas in response to a user operation.

In at least one embodiment, the detection module 103 can averagely divide the at least one function button into the specified number of areas. In other words, each of the specified number of areas has a same size.

In other embodiments, the detection module 103 can divide the at least one function button into the specified number of areas according to a preset proportion. In other words, a size of each of the specified number of areas is determined according to the preset proportion.

In at least one embodiment, the detection module 103 can predetermine a variety of user operations correspond to a plurality of specified number of areas. In other words, the number of areas is determined according to the user operation.

Figure 5A:
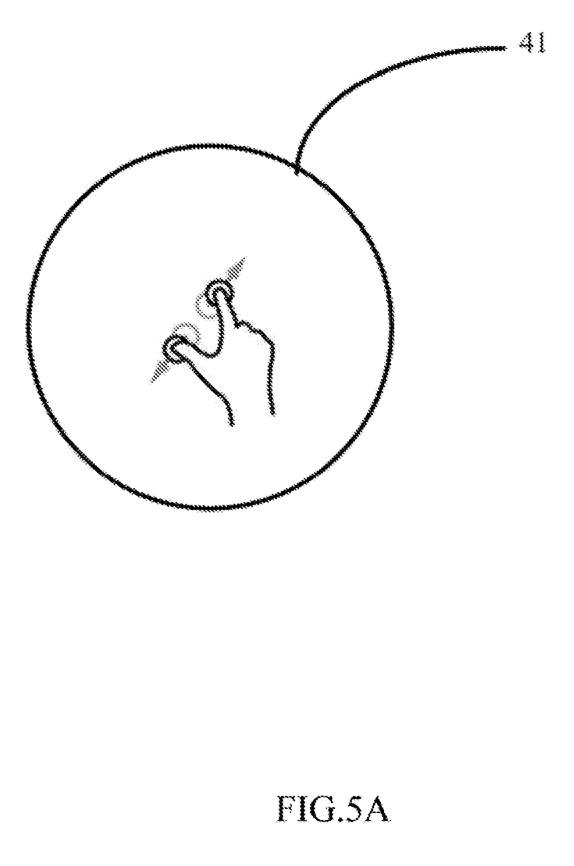
FIGS. 5A-5C illustrate an example of dividing a function button into different areas.
Figure 5B:
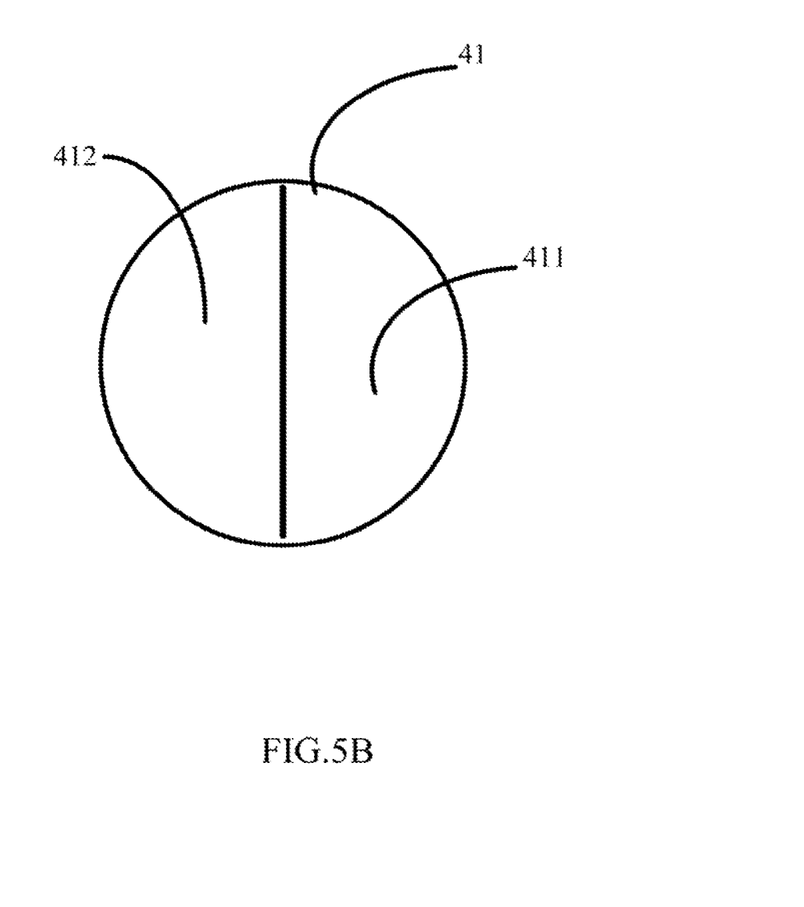
Figure 5C:
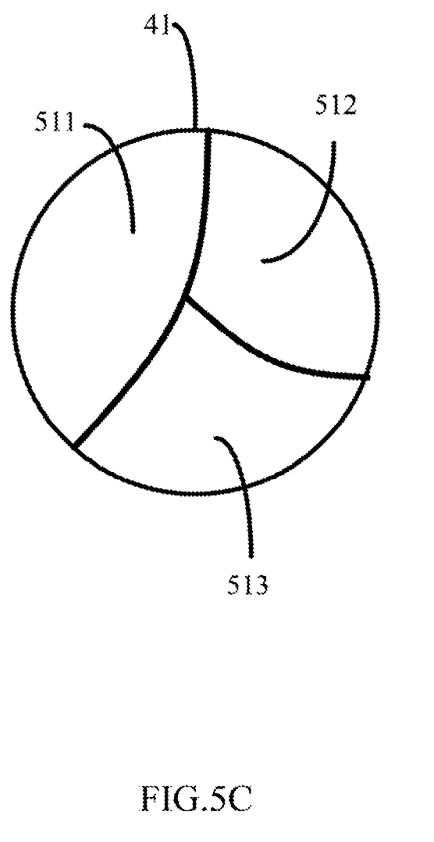

For a first example, as shown in FIG. 5A, if the detection module 103 detects that a distance between two fingers of the user on the forward button 41 is increased, the detection button 103 can averagely divide the forward button 41 into two areas. The two areas include a first area 411 and a second area 412 as shown in FIG. 5B. For a second example, if the detection module 103 detects that a distance between each other of three fingers of the user on the forward button 41 is increased, the detection module 103 can averagely divide the forward button 41 into three areas. The three areas include a third area 511, a fourth area 512, and a fifth area 513 as shown in FIG. 5C. Similarly, the detection module 103 can averagely divide the forward button 41 into four areas, five areas and so on.

In other embodiments, the detection module 103 can generate a line, and display the generated line on the at least one function button to divide the at least one function button.

In other embodiments, the detection module 103 can divide the at least one function button into a plurality of areas according to one or more lines that are generated according to sliding operations of the user on the at least one function button. The one or more lines can include, but are limited to, straight lines, bending lines.

At block 3022, the determination module 102 can determine each of the specified number of areas corresponds to an acceleration speed.

For example, it is assumed that the detection module 103 divides the forward button 41 into the first area 411 and the second area 412. The determination module 102 can determine the first area 411 corresponds to a first acceleration speed (e.g., 5 m/s$^2$) in response to user's input. The determination module 102 can further determine the second area 412 corresponds to a second acceleration speed (e.g., 10 m/s$^2$) in response to user's input.

At block 3023, the determination module 102 can determine one of the specified number of areas is pressed by the user, according to a pressure position on the at least on function button.

At block 3024, the determination module 102 can determine an acceleration speed for the toy 2 according to the pressed area.

For example, it is assumed that the first area 411 is pressed by the user, then the determination module 102 determines the acceleration speed of the toy 2 is 5 m/s$^2$.

At block 3025, the control module 104 can control the toy 2 to execute a function corresponding to the at least one function button, based on the determined acceleration speed.

For a first example, if the user presses the forward button 41, the control module 104 can control the toy 2 to move forward based on the determined acceleration speed.

For a second example, if the user presses the backward button 42, the control module 104 can control the toy 2 to move backward based on the determined acceleration speed.

For a third example, if the user presses the stop button 43, the control module 104 can control the toy 2 to stop based on the determined acceleration speed.

At block 3031, when the user does not need to divide the at least one function button, the detection module 103 can detect a pressure value of the user presses the at least one function button.

At block 3032, the determination module 102 can determine an acceleration speed for the toy 2 according to the detected pressure value. When the block 3032 is executed, the process goes to block 3025.

In at least one embodiment, the detection module 103 can predetermine different pressure value ranges corresponding to different acceleration speeds. Therefore, when the pressure value is detected, the acceleration speed of the toy 2 can be determined.

In at least one embodiment, the determination module 102 can detect a rotation direction of the electronic device 1 using the gyroscope sensor 12. The control module 104 can control the toy 2 to rotate according to the rotation direction of the electronic device 1. For example, if the electronic device 1 rotates right, the control module 104 can control the toy 2 to rotate right.

It should be emphasized that the above-described embodiments of the present disclosure, including any particular embodiments, are merely possible examples of implementations, set forth for a clear understanding of the principles of the disclosure.

Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for controlling a toy using an electronic device, the electronic device comprising a three-dimensional (3D) touch screen, the method comprising:
   generating a control interface comprising at least one function button;
   displaying the control interface on the 3D touch screen;
   determining whether or not to divide the at least one function button;
   dividing, when the at least one function button is determined to be divided, the at least one function button into a specified number of areas in response to a user input, wherein each of the specified number of areas corresponds to an acceleration speed;
   determining one of the specified number of areas that is pressed by a user; and
   determining a first acceleration speed for the toy, wherein the first acceleration speed corresponds to the one of the specified number of areas; and
   controlling the toy to execute a function corresponding to the at least one function button based on the first acceleration speed.

2. The method according to claim 1, further comprising:
   when the at least one function button is determined to be not divided, detecting a pressure value on the at least one function button, wherein different pressure value ranges correspond to different acceleration speeds;
   determining a second acceleration speed for the toy according to the detected pressure value; and
   controlling the toy to execute a function corresponding to the at least one function button based on the second acceleration speed.

3. The method according to claim 1,
   wherein the at least one function button is divided into the specified number of areas when a distance is increased between each other of a specified number of fingers of the user on the at least one function button.

4. The method according to claim 1, wherein the at least one function button is averagely divided into the specified number of areas, each of the specified number of areas having a same size.

5. The method according to claim 1, further comprising:
   detecting a rotation direction of the electronic device using a gyroscope sensor of the electronic device; and
   controlling the toy to rotate according to the rotation direction of the electronic device.

6. The method according to claim 1, wherein the at least one function button comprises a forward button that is used to control the toy to move forward, and a backward button that is used to control the toy to move backward.

7. An electronic device comprising:
   a three-dimensional (3D) touch screen;
   at least one processor; and
   a storage device configured to store one or more programs that, when executed by the at least one processor, cause the at least one processor to:
   generate a control interface comprising at least one function button;
   display the control interface on the 3D touch screen;
   determine whether or not to divide the at least one function button;
   divide, when the at least one function button is determined to be divided, the at least one function button into a specified number of areas in response to a user input, wherein each of the specified number of areas corresponds to an acceleration speed;
   determine one of the specified number of areas that is pressed by a user; and
   determine a first acceleration speed for the toy, wherein the first acceleration speed corresponds to the one of the specified number of areas; and
   control the toy to execute a function corresponding to the at least one function button based on the first acceleration speed.

8. The electronic device according to claim 7, wherein the at least one processor is further caused to:
   when the at least one function button is determined to be not divided, detect a pressure value on the at least one function button, wherein different pressure value ranges correspond to different acceleration speeds;
   determine a second acceleration speed for the toy according to the detected pressure value; and
   control the toy to execute a function corresponding to the at least one function button based on the second acceleration speed.

9. The electronic device according to claim 7,
   wherein the at least one function button is divided into the specified number of areas when a distance is increased between each other of a specified number of fingers of the user on the at least one function button.

10. The electronic device according to claim 7, wherein the at least one function button is averagely divided into the specified number of areas, each of the specified number of areas having a same size.

11. The electronic device according to claim 7, wherein the at least one processor is further caused to:
   detect a rotation direction of the electronic device using a gyroscope sensor of the electronic device; and
   control the toy to rotate according to the rotation direction of the electronic device.

12. The electronic device according to claim 7, wherein the at least one function button comprises a forward button that is used to control the toy to move forward, and a backward button that is used to control the toy to move backward.

13. A non-transitory storage medium having stored thereon instructions that, when executed by a processor of an electronic device, causes the processor to perform a method for controlling a toy, the electronic device comprising a storage device and a three-dimensional (3D) touch screen, wherein the method comprises:
   generating a control interface comprising at least one function button;
   displaying the control interface on the 3D touch screen;

determining whether or not to divide the at least one function button;

dividing, when the at least one function button is determined to be divided, the at least one function button into a specified number of areas in response to a user input, wherein each of the specified number of areas corresponds to an acceleration speed;

determining one of the specified number of areas that is pressed by a user; and determining a first acceleration speed for the toy, wherein the first acceleration speed corresponds to the one of the specified number of areas; and controlling the toy to execute a function corresponding to the at least one function button based on the first acceleration speed.

14. The non-transitory storage medium according to claim 13, further comprising:

when the at least one function button is determined to be not divided, detecting a pressure value on the at least one function button, wherein different pressure value ranges correspond to different acceleration speeds;

determining a second acceleration speed for the toy according to the detected pressure value; and controlling the toy to execute a function corresponding to the at least one function button based on the second acceleration speed.

15. The non-transitory storage medium according to claim 13, wherein the at least one function button is divided into the specified number of areas when a distance is increased between each other of a specified number of fingers of the user on the at least one function button.

16. The non-transitory storage medium according to claim 13, wherein the at least one function button is averagely divided into the specified number of areas, each of the specified number of areas having a same size.

17. The non-transitory storage medium according to claim 13, further comprising:

detecting a rotation direction of the electronic device using a gyroscope sensor of the electronic device; and controlling the toy to rotate according to the rotation direction of the electronic device.

18. The non-transitory storage medium according to claim 13, wherein the at least one function button comprises a forward button that is used to control the toy to move forward, and a backward button that is used to control the toy to move backward.

\* \* \* \* \*